(12) United States Patent  (10) Patent No.: US 12,368,626 B2
Bar-Or Tillinger et al.  (45) Date of Patent: Jul. 22, 2025

(54) TONE RESERVATION SIGNALING USING DISTRIBUTED CODING

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Oren Matsrafi, Yad Modechai (IL); Elad Meir, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 18/363,371

(22) Filed: Aug. 1, 2023

(65) Prior Publication Data

US 2025/0047540 A1   Feb. 6, 2025

(51) Int. Cl.
*H04K 1/10* (2006.01)
*H04L 27/26* (2006.01)

(52) U.S. Cl.
CPC ...... *H04L 27/2618* (2013.01); *H04L 27/2615* (2013.01)

(58) Field of Classification Search
CPC .......... H04L 27/2618; H04L 27/2615
USPC .......................................................... 375/260
See application file for complete search history.

(56) References Cited

U.S. PATENT DOCUMENTS

| 2009/0268604 | A1* | 10/2009 | Yun ...................... H04L 27/2618 375/267 |
| 2022/0400042 | A1* | 12/2022 | Horn ................... H04L 27/2614 |
| 2023/0120730 | A1* | 4/2023 | Horn ................... H04L 27/2618 370/329 |
| 2024/0063988 | A1* | 2/2024 | Uziel .................... H04L 5/0094 |

* cited by examiner

*Primary Examiner* — Helene E Tayong
(74) *Attorney, Agent, or Firm* — Holland & Hart LLP

(57) ABSTRACT

Methods, systems, and devices for wireless communications are described. The described techniques provide for a transmitting device and a receiving device to coordinate channel aware tone reservation (CATR) control information using distributed coding. The transmitting device and receiving device may estimate a similar wireless channel and select a set of reserved tone locations and may each independently encode the set of reserved tone locations. In some cases, the receiving device may receive parity information associated with the set of reserved tone locations selected by the transmitting device and may jointly decode the parity information with the set of reserved tone locations predicted by the receiving device to detect and correct one or more errors in the predicted set of reserved tone locations.

20 Claims, 9 Drawing Sheets

TONE RESERVATION SIGNALING USING DISTRIBUTED CODING

FIELD OF TECHNOLOGY

The following relates to wireless communications, including tone reservation signaling using distributed coding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some cases, a transmitting wireless device may transmit signaling associated with reducing a peak-to-average-power ratio (PAPR). In some examples, the transmitting wireless device may reserve one or more tone locations within a wireless channel for carrying the PAPR reduction signal.

SUMMARY

The described techniques relate to improved methods, systems, devices, and apparatuses that support tone reservation signaling using distributed coding. For example, the described techniques provide for a transmitting device and a receiving device to implement distributed coding for communicating channel aware tone reservation (CATR) control information. In some such examples, the transmitting device may identify a set of tone locations (e.g., positions of reserved tones within a frequency bandwidth) and may encode the set of tone locations into a string of bits indicating systematic information and parity information. For example, the transmitting device may input, to an encoder, a first string of bits indicating the set of tone locations. The encoder may apply a systematic channel code to the string of bits, which may output a second string of bits indicating the systematic information (e.g., identical to the input) and the parity information (e.g., input data embedded into an encoded output). In some examples, the transmitting device may puncture the systematic information from the string of bits. In some cases, the transmitting device may transmit the parity information (e.g., without the systematic information) to the receiving device, thereby reducing signaling overhead due to transmitting a reduced quantity of bits. Additionally, the receiving device may perform channel estimation to determine a predicted set of tone locations, may receive the parity information, and may jointly decode the predicted set of reserved tone locations and the parity information. In some cases, by jointly decoding the predicted tone locations with the parity information, the receiving device may identify and correct one or more errors in the predicted tone locations.

A method for wireless communications by a first device is described. The method may include selecting, based on a channel estimation procedure, a set of tone locations associated with reserving one or more tones for carrying a peak-to-average power ratio (PAPR) reduction signal, encoding the set of tone locations into a set of multiple bits including systematic information and parity information, and transmitting the parity information to a second device, where the parity information indicates an input to a procedure at the second device for jointly decoding the parity information and a prediction of the set of tone locations at the second device.

A first device for wireless communications is described. The first device may include one or more memories storing processor executable code, and one or more processors coupled with the one or more memories. The one or more processors may individually or collectively operable to execute the code to cause the first device to select, based on a channel estimation procedure, a set of tone locations associated with reserving one or more tones for carrying a PAPR reduction signal, encode the set of tone locations into a set of multiple bits including systematic information and parity information, and transmit the parity information to a second device, where the parity information indicates an input to a procedure at the second device for jointly decoding the parity information and a prediction of the set of tone locations at the second device.

Another first device for wireless communications is described. The first device may include means for selecting, based on a channel estimation procedure, a set of tone locations associated with reserving one or more tones for carrying a PAPR reduction signal, means for encoding the set of tone locations into a set of multiple bits including systematic information and parity information, and means for transmitting the parity information to a second device, where the parity information indicates an input to a procedure at the second device for jointly decoding the parity information and a prediction of the set of tone locations at the second device.

A non-transitory computer-readable medium storing code for wireless communications is described. The code may include instructions executable by a processor to select, based on a channel estimation procedure, a set of tone locations associated with reserving one or more tones for carrying a PAPR reduction signal, encode the set of tone locations into a set of multiple bits including systematic information and parity information, and transmit the parity information to a second device, where the parity information indicates an input to a procedure at the second device for jointly decoding the parity information and a prediction of the set of tone locations at the second device.

In some examples of the method, first devices, and non-transitory computer-readable medium described herein, encoding the set of tone locations may include operations, features, means, or instructions for applying systematic channel coding to the set of tone locations, where transmitting the parity information may be based on applying the systematic channel coding.

Some examples of the method, first devices, and non-transitory computer-readable medium described herein may further include operations, features, means, or instructions for puncturing the systematic information from the set of multiple bits based on applying the systematic channel coding to the set of tone locations.

Some examples of the method, first devices, and non-transitory computer-readable medium described herein may further include operations, features, means, or instructions for applying gray coding to the set of tone locations, where transmitting the parity information may be based on applying the gray coding.

In some examples of the method, first devices, and non-transitory computer-readable medium described herein, the systematic information includes a list of the one or more tones.

In some examples of the method, first devices, and non-transitory computer-readable medium described herein, the systematic information includes a list of one or more null positions and a set of frequency bandwidths associated with the one or more null positions.

In some examples of the method, first devices, and non-transitory computer-readable medium described herein, the systematic information includes a vector of binary values indicating indices of the one or more tones and a first binary value indicates a reserved tone position and a second binary value indicates a non-reserved tone position.

In some examples of the method, first devices, and non-transitory computer-readable medium described herein, the parity information includes CATR control information.

In some examples of the method, first devices, and non-transitory computer-readable medium described herein, the parity information includes a set of parity bits.

In some examples of the method, first devices, and non-transitory computer-readable medium described herein, the prediction of the set of tone locations at the second device may be based on an assumption of channel reciprocity between the first device and the second device.

In some examples of the method, first devices, and non-transitory computer-readable medium described herein, transmitting the parity information may include operations, features, means, or instructions for transmitting the parity information via a downlink control information (DCI) message, an uplink control information (UCI) message, a media access control control element (MAC-CE), a radio resource control (RRC) message, or any combination thereof.

DETAILED DESCRIPTION

Figure 1:
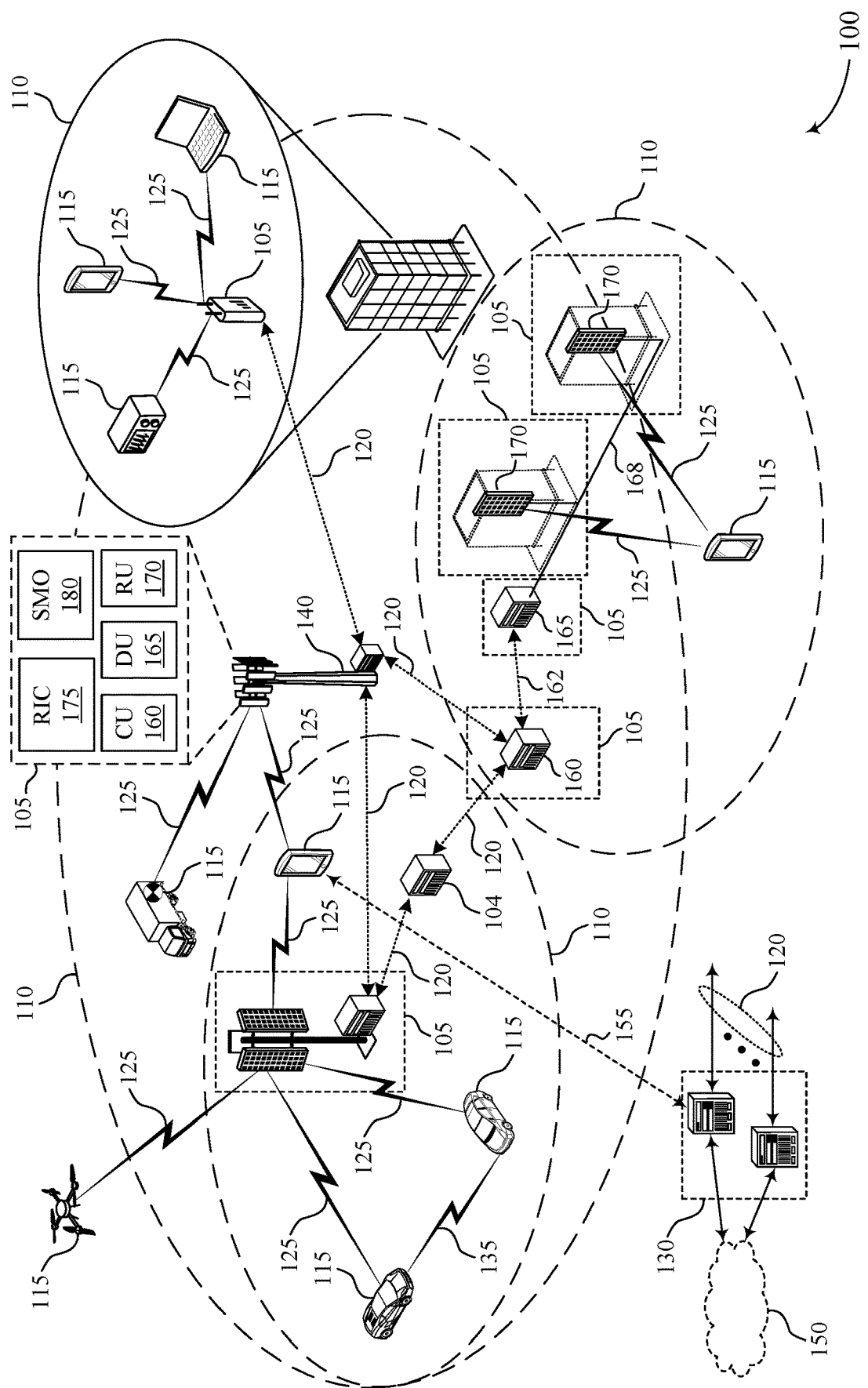
FIG. 1 shows an example of a wireless communications system that supports tone reservation signaling using distributed coding in accordance with one or more aspects of the present disclosure.

In some wireless communications systems, a transmitting wireless device may transmit signaling associated with reducing a peak-to-average power ratio (PAPR) (e.g., suppressing time domain peaks) of communications from the transmitting device. In some examples, the transmitting device may reserve one or more tones (e.g., subcarriers of a wireless channel between the transmitting device and a receiving device) for carrying the PAPR reduction signaling. In some cases, the transmitting device may perform channel aware tone reservation (CATR) to select the reserved tones with respect to channel conditions (e.g., to improve a tradeoff between PAPR reduction and bandwidth reduction). For example, the transmitting device may perform a channel estimation procedure to determine channel conditions associated with each tone of the wireless channel and may select tones with relatively poor channel conditions (e.g., tones unsuitable for data transmission, tones with a lowest channel capacity) for the PAPR reduction signaling. However, both the transmitting device and receiving device may determine the reserved tone locations according to channel conditions, which may result in one or more errors (e.g., each device may determine different reserved tones). Further, communicating the reserved tone locations between the transmitting device and the receiving device may incur significant signaling overhead (e.g., transmitting a relatively large quantity of bits to indicate each reserved tone location).

To mitigate signaling overhead of CATR coordination for PAPR reduction signaling, a transmitting device and a receiving device may implement distributed coding for communicating CATR control information. In some such examples, the transmitting device may identify a set of reserved tone locations (e.g., via channel estimation) and may encode the set of tone locations into a string of bits indicating systematic information and parity information. In some cases, the transmitting device may generate the systematic information as a list of the reserved tone locations, a list of null positions and widths for a wireless channel between the transmitting device and the receiving device, a vector of binary values indicating indices of the reserved tone locations, or any combination thereof. For example, the transmitting device may input, to an encoder, a first string of bits indicating the set of tone locations. The encoder may apply a systematic channel code to the string of bits, which may output a second string of bits indicating the systematic information (e.g., identical to the input) and the parity information (e.g., input data embedded into an encoded output). In some examples, the transmitting device may puncture the systematic information from the string of bits. In some cases, the transmitting device may transmit the parity information (e.g., without the systematic information) to the receiving device, thereby reducing signaling overhead due to transmitting a reduced quantity of bits. Additionally, the receiving device may perform channel estimation to determine a predicted set of reserved tone locations, may receive the parity information, and may jointly decode the predicted set of reserved tone locations and the parity information. In some cases, by jointly decoding the predicted tone locations with the parity information, the receiving device may identify and correct one or more errors in the predicted tone locations.

Aspects of the disclosure are initially described in the context of wireless communications systems. Aspects of the disclosure are further illustrated by and described with reference to a process flow. Aspects of the disclosure are further illustrated by and described with reference to apparatus diagrams, system diagrams, and flowcharts that relate to tone reservation signaling using distributed coding.

FIG. 1 shows an example of a wireless communications system 100 that supports tone reservation signaling using distributed coding in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and Ues 115 may wirelessly communicate via one or more communication links 125 (e.g., a radio frequency (RF) access link). For example, a network entity 105 may support a coverage area 110 (e.g., a geographic coverage area) over which the Ues 115 and the network entity 105 may establish one or more communication links 125. The coverage area 110 may be an example of a geographic area over which a network entity 105 and a UE 115 may support the communication of signals according to one or more radio access technologies (RATs).

The Ues 115 may be dispersed throughout a coverage area 110 of the wireless communications system 100, and each UE 115 may be stationary, or mobile, or both at different times. The Ues 115 may be devices in different forms or having different capabilities. Some example Ues 115 are illustrated in FIG. 1. The Ues 115 described herein may be capable of supporting communications with various types of devices, such as other Ues 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (cNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more Dus 165 or Rus 170, and the one or more Dus 165 or Rus 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more Rus 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more Dus 165 via a midhaul communication link 162 (e.g., F1, F1-c, F1-u), and a DU 165 may be connected to one or more Rus 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more Dus 165 or one or more Rus 170 may be partially controlled by one or more Cus 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by Dus 165 of a coupled IAB donor. An IAB-MT may include an independent set of antennas for relay of communications with Ues 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include Dus 165 that support communication links with additional entities (e.g., IAB nodes 104, Ues 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support tone reservation signaling using distributed coding as described herein. For example, some operations described as being performed by a UE 115 or a network entity 105 (e.g., a base station 140) may additionally, or alternatively, be performed by one or more components of the disaggregated RAN architecture (e.g., IAB nodes 104, Dus 165, Cus 160, Rus 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The Ues 115 described herein may be able to communicate with various types of devices, such as other Ues 115 that may sometimes act as relays as well as the network entities 105 and the network equipment including macro eNBs or gNBs, small cell eNBs or gNBs, or relay base stations, among other examples, as shown in FIG. 1.

The Ues 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the Ues 115, or both) may have hardware configurations that support communications using a particular carrier bandwidth or may be configurable to support communications using one of a set of carrier bandwidths. In some examples, the wireless communications system 100 may include network entities 105 or Ues 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the Ues 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the Ues 115. For example, one or more of the Ues 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple Ues 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The Ues 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other Ues 115 via a device-to-device (D2D) communication link 135 (e.g., in accordance with a peer-to-peer (P2P), D2D, or sidelink protocol). In some examples, one or more Ues 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more Ues 115 of such a group may be outside the coverage area 110 of a network entity 105 or may be otherwise unable to or not configured to receive transmissions from a network entity 105. In some examples, groups of the Ues 115 communicating via D2D communications may support a one-to-many (1:M) system in which each UE 115 transmits to each of the other Ues 115 in the group. In some examples, a network entity 105 may facilitate the scheduling of resources for D2D communications. In some other examples, D2D communications may be carried out between the Ues 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the Ues 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the Ues 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the Ues 115 and the network entities 105 (e.g., base stations 140, Rus 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the Ues 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

As described herein, the wireless communications system 100 may support tone reservation for PAPR reduction signaling. For example, a transmitting wireless device (e.g., a network entity 105 or a UE 115) may reserve a percentage of tones (e.g., subcarriers) for one or more symbols that are dedicated to carrying a signal which reduces a PAPR of a transmission. For example, a PAPR reduction signal may suppress time domain peaks of the transmission, thereby enabling the transmitting device to increase a power amplifier operating point and improve power amplifier efficiency. In some cases, however, random selection of reserved tones may result in a poor tradeoff between PAPR reduction and bandwidth reduction (e.g., reserving tones for PAPR reduction may adversely affect data transmissions during a same symbol).

Accordingly, the transmitting device may implement CATR to select reserved tones with respect to channel conditions. For example, the transmitting device may perform a channel estimation procedure to identify channel conditions (e.g., channel capacity) for each tone of a wireless channel and may select tones to reserve for PAPR reduction signaling based on the channel conditions. In such examples, the transmitting device may select one or more tones with relatively poor channel conditions (e.g., tones with a lowest channel capacity or less suitable for data communications) for the PAPR reduction signaling, thereby supporting PAPR reduction while mitigating an impact of the PAPR reduction signaling on channel capacity.

In some examples, the transmitting device may coordinate with a receiving device (e.g., a UE 115 or a network entity 105) to support communicating data concurrently with the PAPR reduction signaling. For example, if channel reciprocity is assumed between the transmitting device and the receiving device, the receiving device may perform a channel estimation procedure to predict which tones were reserved by the transmitting device (e.g., based on measured channel conditions) and may receive a transmission based on the predicted tone reservations. In some examples, however, discrepancies between the tone reservations by the transmitting device and the predicted tone reservations by the receiving device may result in communication errors (e.g., particularly in mobility conditions). Additionally, or alternatively, if tone reservation is performed with rate matching (e.g., instead of with puncturing), an error in tone reservation coordination may result in the receiving device failing to decode the entire data transmission.

In some examples, the transmitting device may transmit CATR control information to the receiving device indicating the reserved tone locations to improve coordination with the receiving device. However, communicating the CATR control information may incur significant signaling overhead between the transmitting device and the receiving device (e.g., due to indicating each reserved tone location). To mitigate overhead when communicating CATR control information, the transmitting device and the receiving device may implement distributed coding to the CATR control information. For example, the transmitting device may encode, using a systematic channel code, the reserved tone locations into a string of bits that includes systematic information (e.g., indicating the reserved tone locations) and parity information (e.g., representing the systematic information using a reduced quantity of bits). The transmitting device may then puncture the systematic information and may transmit the parity information to the receiving device (e.g., without the systematic information). In some cases, the receiving device may perform channel estimation for a same wireless channel as the transmitting device (e.g., correlated sources) to generate the predicted reserved tone locations. Due to channel reciprocity, the receiving device may jointly decode the predicted reserved tone locations and the received parity information to identify and correct errors in the predicted reserved tone locations.

Figure 2:
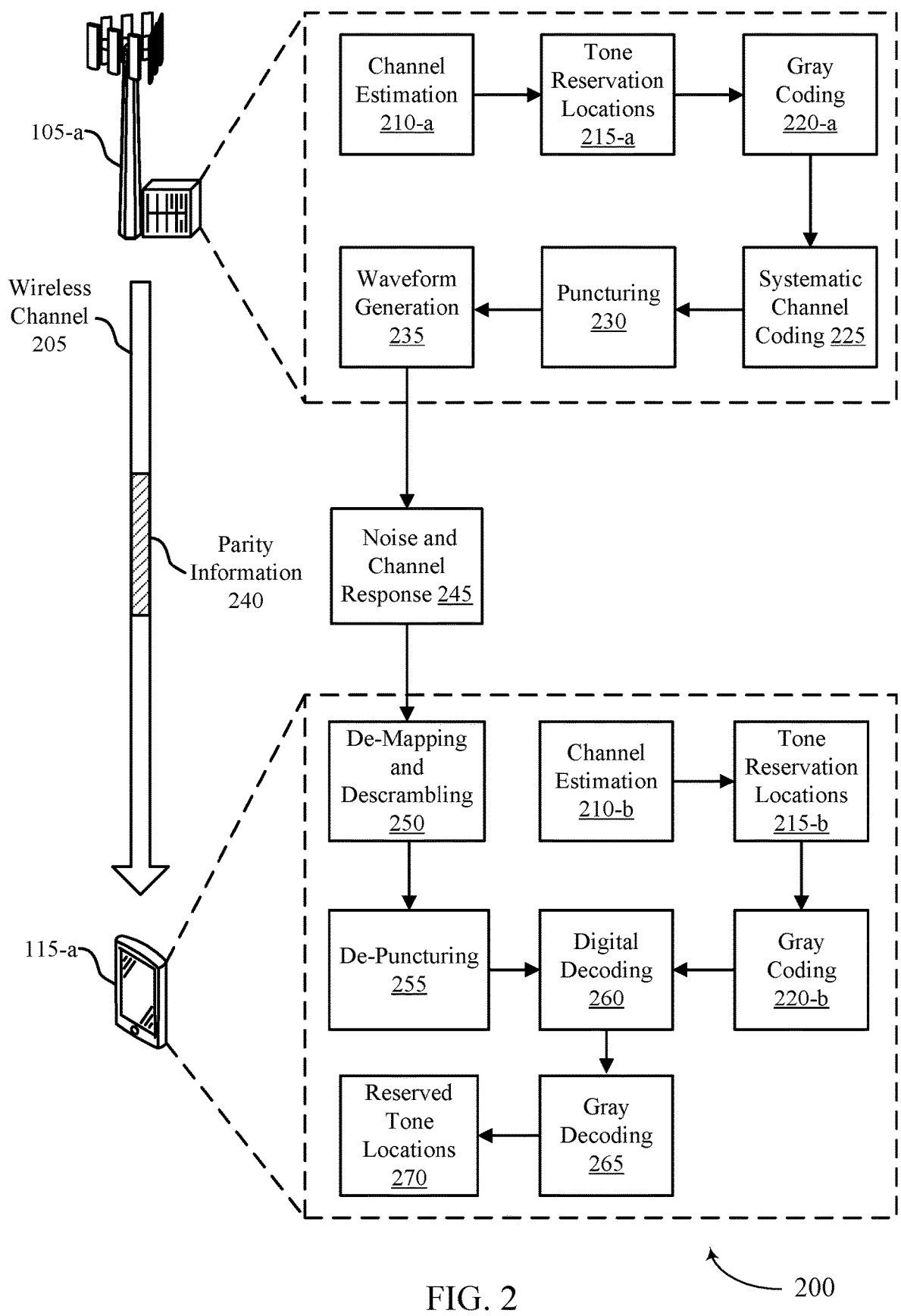
FIG. 2 shows an example of a wireless communications system that supports tone reservation signaling using distributed coding in accordance with one or more aspects of the present disclosure.

FIG. 2 shows an example of a wireless communications system 200 that supports tone reservation signaling using distributed coding in accordance with one or more aspects of the present disclosure. The wireless communications system 200 may implement one or more aspects of the wireless communications system 100. For example, the wireless communications system 200 may include a network entity 105-*a* and a UE 115-*a*, which may be examples of corresponding devices described with reference to FIG. 1. In some cases, the network entity 105-*a* may be an example of a transmitting device communicating CATR control information with the UE 115-*a* (e.g., a receiving device) while reducing signaling overhead associated with such communications. It should be noted that operations performed by the network entity 105-*a* may instead be performed by another wireless device (e.g., a UE 115, another network device).

In some examples, the network entity 105-*a* and the UE 115-*a* may communicate CATR control information to coordinate reserved tone locations (e.g., a position of a reserved tone in frequency) within a wireless channel 205. For example, the network entity 105-*a* may reserve a percentage of tones (e.g., subcarriers) of the wireless channel 205 for carrying a PAPR reduction signal. In some cases, the network entity 105-*a* may indicate the reserved tone locations to the UE 115-*a* (e.g., to avoid the UE 115-*a* attempting to receive data via a reserved tone). However, directly indicating the reserved tone locations may incur significant signaling overhead, may limit a robustness of the CATR coordination, or both.

In some cases, the network entity 105-*a* and the UE 115-*a* may implement distributed coding to communicate the CATR coordination while mitigating or otherwise reducing signaling overhead. In such examples, the network entity 105-*a* and the UE 115-*a* may each estimate the wireless channel 205 (e.g., the same channel) to generate a list of reserved tone locations. For example, the network entity 105-*a* may perform a channel estimation 210-*a* and the UE 115-*a* may perform a channel estimation 210-*b*, each of which may be an estimation of the wireless channel 205. In some cases, channel reciprocity may be assumed between the network entity 105-*a* and the UE 115-*a*, which may indicate that the network entity 105-*a* and the UE 115-*a* are estimating a similar wireless channel. In some cases, such estimations may be an example of correlated sources, which may support an independent encoding of the sources (e.g., as an alternative to jointly encoding the sources). For example, the network entity 105-*a* may encode a set of tone reservation locations 215-*a* according to the channel estimation 210-*a* and the UE 115-*a* may encode a set of tone reservation locations 215-*b* (e.g., predicted tone reservation locations) according to the channel estimation 210-*b*.

In some cases, the network entity 105-*a* may encode the tone reservation locations 215-*a*. As an example, the network entity 105-*a* may encode the tone reservation locations 215-*a* as a list of the reserved tones. For example, the network entity 105-*a* may encode a binary representation of each reserved tone location, where a quantity of bits for each reserved tone location is based on a quantity of tones in the wireless channel 205 (e.g., 4 bit representations for a 12 tone channel). In such examples, a quantity of the reserved tones may be known to the network entity 105-*a* and the UE 115-*a* (e.g., a preconfigured quantity) and the CATR control information may be expected to change relatively infrequently.

As another example, the network entity 105-*a* may encode the tone reservation locations 215-*a* as a list of null positions of the wireless channel 205 and widths (e.g., bandwidths) associated with the null positions. For example, due to channel bandwidth coherency, the UE 115-*a* may expect the reserved tone locations to be concentrated over one or more of the null positions of the wireless channel 205. In such examples, a quantity of the one or more clusters may be known to the network entity 105-*a* and the UE 115-*a* (e.g., a preconfigured quantity).

As another example, the network entity 105-*a* may encode the tone reservation locations 215-*a* as a binary vector indicating indices of the reserved tones. For example, the network entity 105-*a* may encode the tone reservation locations 215-*a* into a string of binary values with a length equal to a quantity of tones of the wireless channel 205, and may insert a first binary value (e.g., a '1') at indices corresponding to a reserved tone and may insert a second binary value (e.g., a '0') at indices corresponding to a non-reserved tone.

In some examples, the network entity 105-*a* may apply gray coding 220-*a* to the tone reservation locations 215-*a*. For example, if the network entity 105-*a* encoded the tone reservation locations 215-*a* as a list of the reserved tone locations or as a list of the null positions of the wireless channel 205, the network entity 105-*a* may apply the gray coding 220-*a* to the encoded tone reservation locations 215-*a*. By applying the gray coding 220-*a*, the network entity 105-*a* may ensure that relatively small errors in a Euclidean distance would translate to a relatively small binary distance (e.g., a Hamming distance). For example, the gray coding 220-*a* may reduce a likelihood that each bit of a reserved tone location binary representation is modified due to a small error by the UE 115-*a* (e.g., predicting an incorrect reserved tone location that is adjacent to an actual reserved tone location).

In some cases, the UE 115-*a* may encode the tone reservation locations 215-*b* using similar techniques as the network entity 105-*a* (e.g., using a corresponding encoding technique to generate the predicted tone locations) and may apply gray coding 220-*b* to the tone reservation locations 215-*b* (e.g., when applicable). Additionally, or alternatively, the UE 115-*a* may apply soft-prediction (e.g., predicted values may have variable reliability), soft-demodulation, and soft-decoding techniques when verifying CATR control information.

After encoding the set of reserved tone locations, the network entity 105-*a* may apply systematic channel coding 225 to the encoded tone reservation locations 215-*a*. In some cases, applying the systematic channel coding 225 may generate parity information related to the set of reserved tone locations (e.g., the set of reserved tone locations may be embedded into an output of the systematic channel coding 225). For example, if the network entity 105-*a* encodes the tone reservation locations 215-*a* into a set of binary indices [0, 1, 0, 0, 0, 1, 0, 0, 0, 0, 1, 0] (e.g., reserved tones at positions 2, 6, and 11), applying the systematic channel coding 225 may generate the set of binary indices (e.g., an identical set of bits as the input) as well as a set of parity bits [1, 0, 1, 0]. In some examples, the network entity 105-*a* may generate the parity information such that the parity information is sufficient to correct an error between the reserved tone locations at the network entity 105-*a* and the predicted tone locations at the UE 115-*a*.

In some cases, the network entity 105-*a* may remove the systematic information (e.g., the tone reservation locations 215-*a*) from the generated information via puncturing 230. For example, the set of binary indices may be punctured such that only the parity bits remain for transmission. The network entity 105-*a* may then perform waveform generation 235 to generate a waveform for transmitting parity information 240 (e.g., the parity bits). In some cases, the network entity 105-*a* may scramble, modulate, and map the parity information 240 to support the waveform generation 235.

The network entity 105-*a* may transmit the parity information 240 via the wireless channel 205, which may apply noise and a channel response 245 to the parity information 240 waveform. In some cases, the network entity 105-*a* may transmit the parity information 240 as a DCI message, a UCI message, a MAC-CE, an RRC message, or any combination thereof. In some cases, the UE 115-*a* may receive the parity information 240 via the wireless channel 205.

After receiving the parity information 240, the UE 115-*a* may perform de-mapping and descrambling 250 on the received waveform. Additionally, the UE 115-*a* may perform de-puncturing 255 on the received waveform, which may result in the UE 115-*a* obtaining the parity information generated by the network entity 105-*a* (e.g., the parity bits).

In some examples, the UE 115-*a* may perform digital decoding 260, which may support the UE 115-*a* detecting and correcting errors in the predicted set of reserved tone locations. For example, the UE 115-*a* may jointly decode the parity information with the predicted set of reserved tone locations to identify errors in the predicted set of reserved tone locations. Additionally, if the network entity 105-*a* applied gray coding 220-*a* to the tone reservation locations 215-*a*, the UE 115-*a* may apply gray decoding 265. Due to independently encoding the correlated sources (e.g., applying distributed coding), the parity information may be sufficient to correct the errors, enabling the UE 115-*a* to determine reserved tone locations 270 (e.g., an accurate set of reserved tone locations) without explicit indication from the network entity 105-*a* (e.g., reducing signaling overhead).

Figure 3:
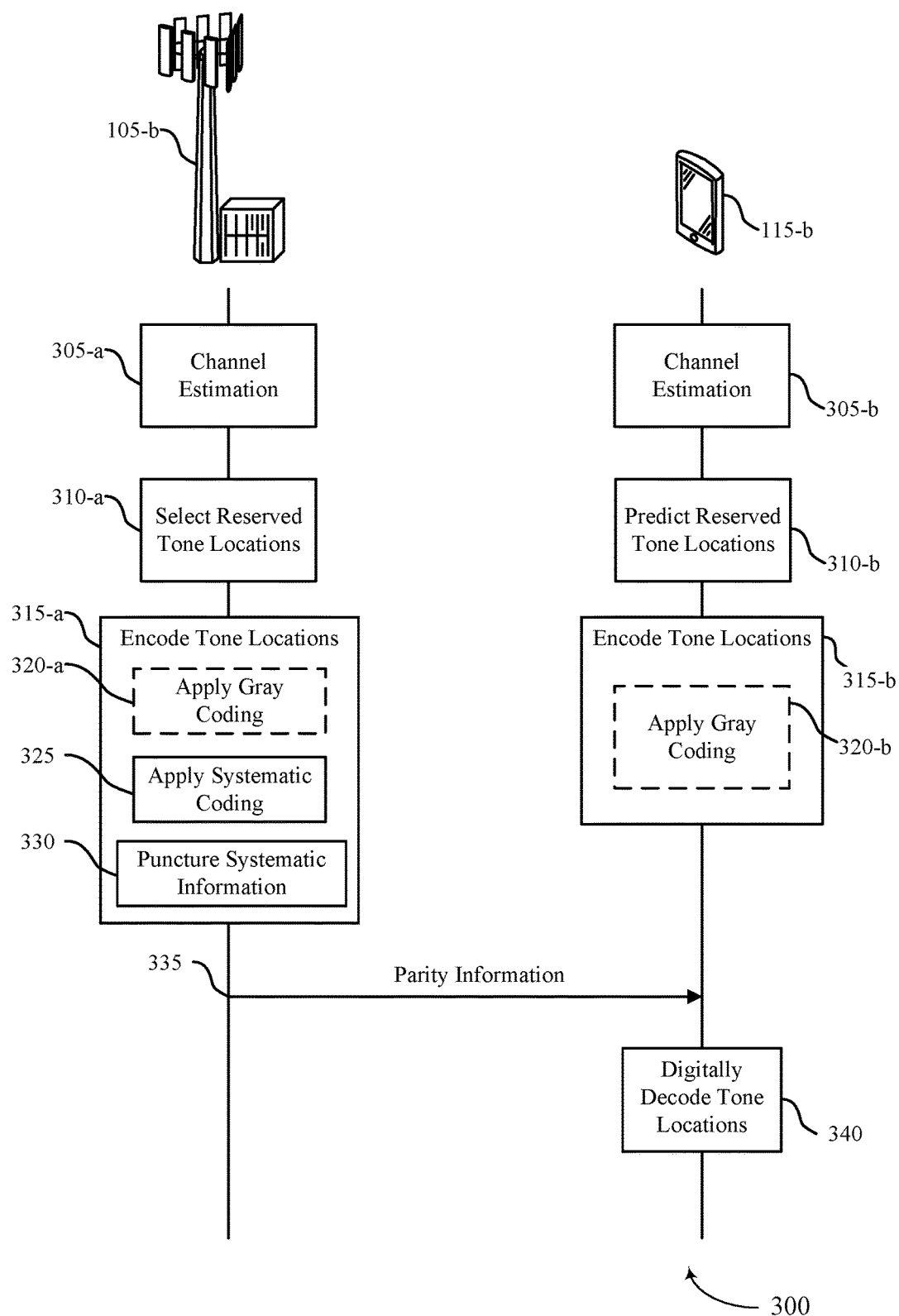
FIG. 3 shows an example of a process flow that supports tone reservation signaling using distributed coding in accordance with one or more aspects of the present disclosure.

FIG. 3 shows an example of a process flow 300 that supports tone reservation signaling using distributed coding in accordance with one or more aspects of the present disclosure. The process flow 300 may implement, or be implemented by, one or more aspects of the wireless communications systems 100 and 200. For example, the process flow 300 may include signaling between a network entity 105-*b* and a UE 115-*b*, which may be examples of corresponding devices described with reference to FIGS. 1 and 2. The process flow 300 may support the UE 115-*b* identifying a set of tone locations associated with reserving one or more tones for carrying a PAPR reduction signal using distributed coding techniques described herein. Alternative examples of the following may be implemented, where some processes are performed in a different order than described or are not performed. In some cases, processes may include additional features not mentioned below, or further processes may be added.

At 305-*a* and 305-*b*, the network entity 105-*b* and the UE 115-*b*, respectively, may perform a channel estimation procedure on a wireless channel. In some cases, the channel estimation procedure may support the network entity 105-*b* and the UE 115-*b* identifying channel conditions for one or more tones (e.g., subcarriers) of the wireless channel.

At 310-*a*, the network entity 105-*b* may select, based on the channel estimation procedure, a set of tone locations associated with reserving one or more tones for carrying a PAPR reduction signal. In some cases, the selection may be part of a CATR and the network entity 105-*b* may select the reserved tone locations with respect to the estimated channel conditions. For example, the network entity 105-*a* may select tones with relatively poor channel conditions (e.g., a lowest channel capacity, tones less suitable for data communications) to carry the PAPR reduction signal.

At 310-*b*, the UE 115-*b* may predict the set of tone locations based on the channel estimation procedure. For example, the UE 115-*b* may predict which tone locations were selected for reservation by the network entity 105-*b* according to the estimated channel conditions (e.g., predicting tones with poor channel conditions). In some cases, the prediction of the set of tone locations may be based on an assumption of channel reciprocity between the network entity 105-*b* and the UE 115-*b*.

At 315-*a*, the network entity 105-*b* may encode the set of tone locations into a set of multiple bits including systematic information and parity information. In some cases, the systematic information may include a list of the one or more tones (e.g., binary representations of the tone locations), a list of one or more null positions of the wireless channel and a set of frequency bandwidths associated with the one or more null positions, a vector of binary values indicating indices of the one or more tones (e.g., such that a first binary value indicates a reserved tone location and a second binary value indicates a non-reserved tone location), or any combination thereof.

At 315-*b*, the UE 115-*b* may encode the predicted set of tone locations into a set of bits including systematic information using similar techniques to the network entity 105-*b* at 315-*a*.

At 320-*a* and 320-*b*, the network entity 105-*b* and the UE 115-*b*, respectively, may apply gray coding to the set of tone locations and the predicted set of tone locations. For example, if the network entity 105-*b* encoded the set of tone locations as a list of the one or more tones or a list of the one or more null positions, the network entity 105-*b* may apply gray coding to ensure that relatively small errors in a Euclidean distance would translate to a relatively small binary distance (e.g., a Hamming distance). The UE 115-*b* may similarly apply gray coding to the predicted set of tone locations (e.g., if applicable).

At 325, the network entity 105-*b* may apply systematic channel coding to the set of tone locations. In some cases, applying the systematic channel coding to the set of tone locations may generate the parity information (e.g., a set of parity bits) associated with the systematic information. For example, the parity information may represent the systemic information using a smaller quantity of bits. In some cases, the network entity 105-*b* may generate the parity information such that the parity information is sufficient to correct an expected error (e.g., a maximum conditional entropy) of the predicted set of tone locations.

At 330, the network entity 105-*b* may puncture the systemic information from the set of multiple bits based on applying the systematic channel coding to the set of tone locations. For example, the network entity 105-*b* may remove the systematic information from the set of multiple bits (e.g., isolating the parity information).

At 335, the network entity 105-*b* may transmit the parity information to the UE 115-*b* based on encoding the set of tone locations and puncturing the systematic information. The network entity 105-*b* may transmit the parity information as a DCI message, a UCI message, a MAC-CE, an RRC message, or any combination thereof. In some cases, the parity information may be an example of CATR control information.

At 340, the UE 115-*b* may digitally decode the set of tone locations based on receiving the parity information and encoding the predicted set of tone locations. For example, the UE 115-*b* may use the parity information as an input to a procedure for jointly decoding the parity information and the prediction of the set of tone locations. By jointly decoding the parity information and the prediction of the set of tone locations (e.g., independently encoded correlated sources), the UE 115-*b* may identify and correct one or more errors in the predicted set of tone locations. Thus, the UE 115-*b* may identify an accurate set of reserved tone locations while mitigating or otherwise reducing signaling overhead from the network entity 105-*b*. Additionally, such techniques may improve robustness of CATR coordination (e.g., in mobility scenarios) by mitigating adverse effects associated with unsuccessful decoding.

Figure 4:
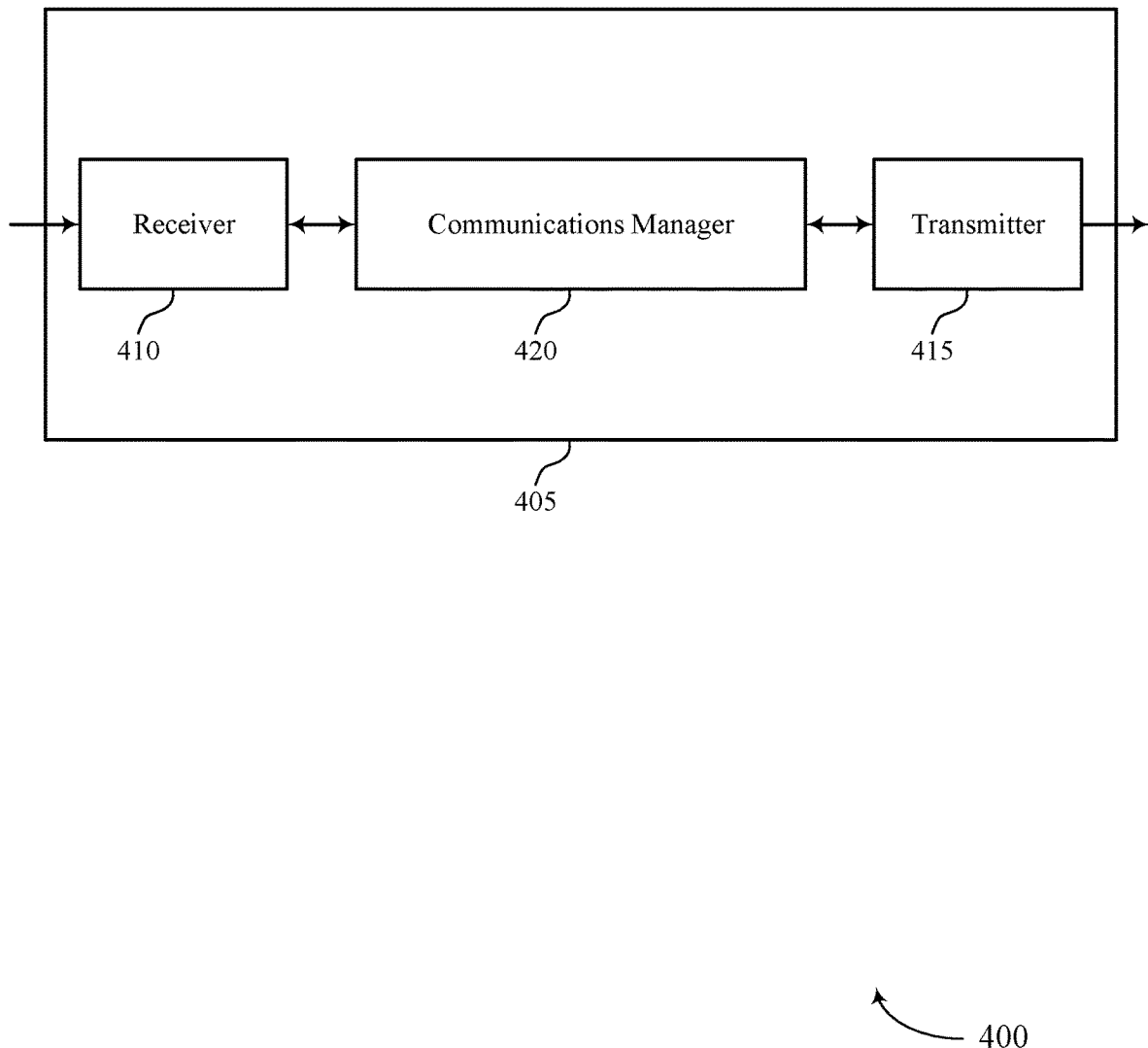
FIGS. 4 and 5 show block diagrams of devices that support tone reservation signaling using distributed coding in accordance with one or more aspects of the present disclosure.

FIG. 4 shows a block diagram 400 of a device 405 that supports tone reservation signaling using distributed coding in accordance with one or more aspects of the present disclosure. The device 405 may be an example of aspects of a UE 115 or a network entity 105 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to tone reservation signaling using distributed coding). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to tone reservation signaling using distributed coding). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of tone reservation signaling using distributed coding as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for selecting, based on a channel estimation procedure, a set of tone locations associated with reserving one or more tones for carrying a PAPR reduction signal. The communications manager 420 is capable of, configured to, or operable to support a means for encoding the set of tone locations into a set of multiple bits including systematic information and parity information. The communications manager 420 is capable of, configured to, or operable to support a means for transmitting the parity information to a second device, where the parity information indicates an input to a procedure at the second device for jointly decoding the parity information and a prediction of the set of tone locations at the second device.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reducing signaling overhead by applying distributed coding to CATR coordination, thereby improving communication speeds.

Figure 5:
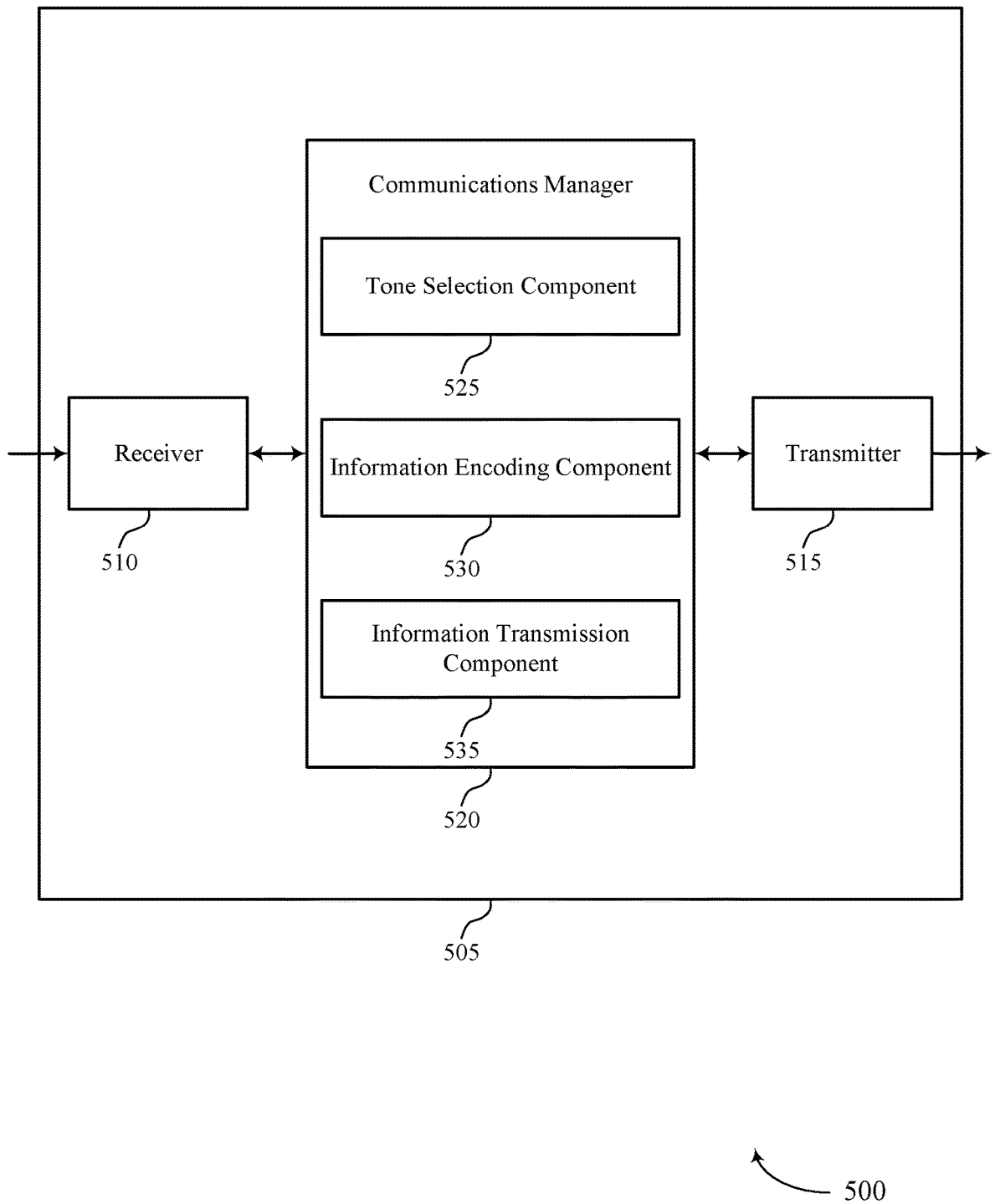

FIG. 5 shows a block diagram 500 of a device 505 that supports tone reservation signaling using distributed coding in accordance with one or more aspects of the present disclosure. The device 505 may be an example of aspects of a device 405, a UE 115, or a network entity 105 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to tone reservation signaling using distributed coding). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to tone reservation signaling using distributed coding). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of tone reservation signaling using distributed coding as described herein. For example, the communications manager 520 may include a tone selection component 525, an information encoding component 530, an information transmission component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The tone selection component 525 is capable of, configured to, or operable to support a means for selecting, based on a channel estimation procedure, a set of tone locations associated with reserving one or more tones for carrying a PAPR reduction signal. The information encoding component 530 is capable of, configured to, or operable to support a means for encoding the set of tone locations into a set of multiple bits including systematic information and parity information. The information transmission component 535 is capable of, configured to, or operable to support a means for transmitting the parity information to a second device, where the parity information indicates an input to a procedure at the second device for jointly decoding the parity information and a prediction of the set of tone locations at the second device.

Figure 6:
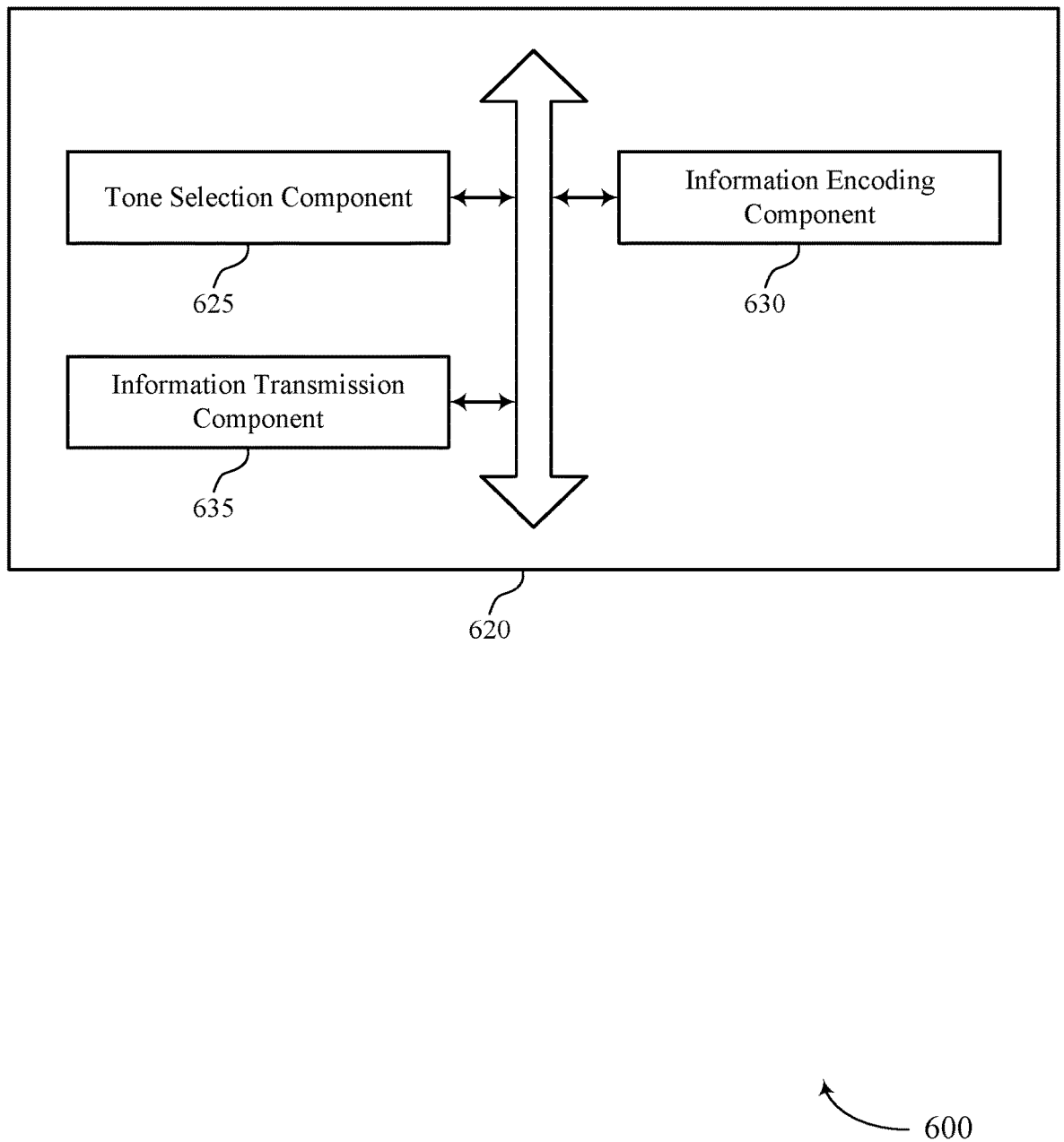
FIG. 6 shows a block diagram of a communications manager that supports tone reservation signaling using distributed coding in accordance with one or more aspects of the present disclosure.

FIG. 6 shows a block diagram 600 of a communications manager 620 that supports tone reservation signaling using distributed coding in accordance with one or more aspects of the present disclosure. The communications manager 620 may be an example of aspects of a communications manager 420, a communications manager 520, or both, as described herein. The communications manager 620, or various components thereof, may be an example of means for performing various aspects of tone reservation signaling using distributed coding as described herein. For example, the communications manager 620 may include a tone selection component 625, an information encoding component 630, an information transmission component 635, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 620 may support wireless communications in accordance with examples as disclosed herein. The tone selection component 625 is capable of, configured to, or operable to support a means for selecting, based on a channel estimation procedure, a set of tone locations associated with reserving one or more tones for carrying a PAPR reduction signal. The information encoding component 630 is capable of, configured to, or operable to support a means for encoding the set of tone locations into a set of multiple bits including systematic information and parity information. The information transmission component 635 is capable of, configured to, or operable to support a means for transmitting the parity information to a second device, where the parity information indicates an input to a procedure at the second device for jointly decoding the parity information and a prediction of the set of tone locations at the second device.

In some examples, to support encoding the set of tone locations, the information encoding component 630 is capable of, configured to, or operable to support a means for applying systematic channel coding to the set of tone locations, where transmitting the parity information is based on applying the systematic channel coding.

In some examples, the information encoding component 630 is capable of, configured to, or operable to support a means for puncturing the systematic information from the set of multiple bits based on applying the systematic channel coding to the set of tone locations.

In some examples, the information encoding component 630 is capable of, configured to, or operable to support a means for applying gray coding to the set of tone locations, where transmitting the parity information is based on applying the gray coding.

In some examples, the systematic information includes a list of the one or more tones.

In some examples, the systematic information includes a list of one or more null positions and a set of frequency bandwidths associated with the one or more null positions.

In some examples, the systematic information includes a vector of binary values indicating indices of the one or more tones. In some examples, a first binary value indicates a reserved tone location and a second binary value indicates a non-reserved tone location.

In some examples, the parity information includes channel aware tone reservation control information.

In some examples, the parity information includes a set of parity bits.

In some examples, the prediction of the set of tone locations at the second device is based on an assumption of channel reciprocity between the first device and the second device.

In some examples, to support transmitting the parity information, the information transmission component 635 is capable of, configured to, or operable to support a means for transmitting the parity information via a downlink control information message, an uplink control information message, a media access control control element, a radio resource control message, or any combination thereof.

Figure 7:
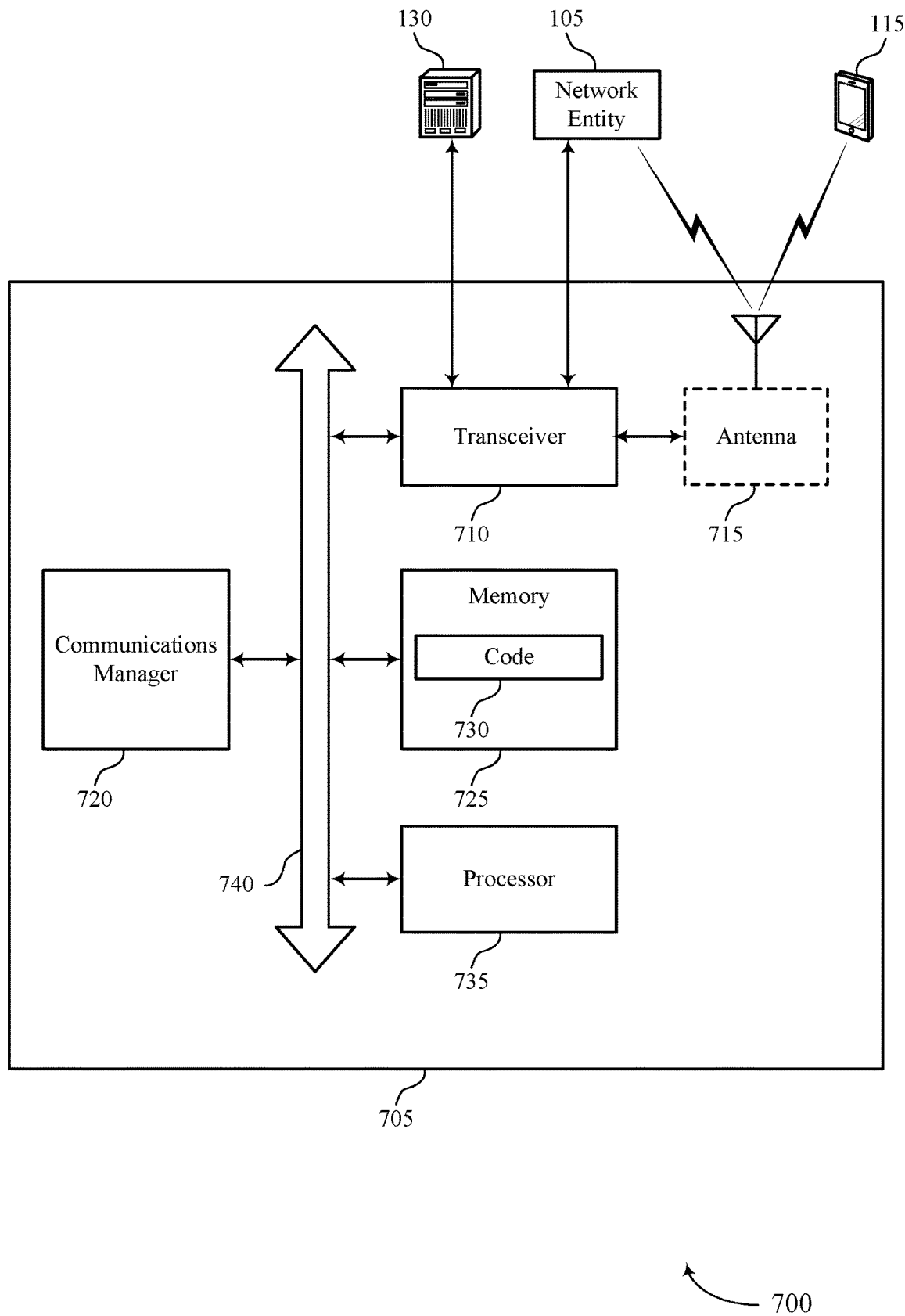
FIG. 7 shows a diagram of a system including a UE that supports tone reservation signaling using distributed coding in accordance with one or more aspects of the present disclosure.

FIG. 7 shows a diagram of a system 700 including a device 705 that supports tone reservation signaling using distributed coding in accordance with one or more aspects of the present disclosure. The device 705 may be an example of or include the components of a device 405, a device 505, or a network entity 105 as described herein. The device 705 may communicate with one or more network entities 105, one or more UEs 115, or any combination thereof, which may include communications over one or more wired interfaces, over one or more wireless interfaces, or any combination thereof. The device 705 may include components that support outputting and obtaining communications, such as a communications manager 720, a transceiver 710, an antenna 715, at least one memory 725, code 730, and at least one processor 735. These components may be in electronic communication or otherwise coupled (e.g., operatively, communicatively, functionally, electronically, electrically) via one or more buses (e.g., a bus 740).

The transceiver 710 may support bi-directional communications via wired links, wireless links, or both as described herein. In some examples, the transceiver 710 may include a wired transceiver and may communicate bi-directionally with another wired transceiver. Additionally, or alternatively, in some examples, the transceiver 710 may include a wireless transceiver and may communicate bi-directionally with another wireless transceiver. In some examples, the device 705 may include one or more antennas 715, which may be capable of transmitting or receiving wireless transmissions (e.g., concurrently). The transceiver 710 may also include a modem to modulate signals, to provide the modulated signals for transmission (e.g., by one or more antennas 715, by a wired transmitter), to receive modulated signals (e.g., from one or more antennas 715, from a wired receiver), and to demodulate signals. In some implementations, the transceiver 710 may include one or more interfaces, such as one or more interfaces coupled with the one or more antennas 715 that are configured to support various receiving or obtaining operations, or one or more interfaces coupled with the one or more antennas 715 that are configured to support various transmitting or outputting operations, or a combination thereof. In some implementations, the transceiver 710 may include or be configured for coupling with one or more processors or one or more memory components that are operable to perform or support operations based on received or obtained information or signals, or to generate information or other signals for transmission or other outputting, or any combination thereof. In some implementations, the transceiver 710, or the transceiver 710 and the one or more antennas 715, or the transceiver 710 and the one or more antennas 715 and one or more processors or one or more memory components (e.g., the at least one processor 735, the at least one memory 725, or both), may be included in a chip or chip assembly that is installed in the device 705. In some examples, the transceiver 710 may be operable to support communications via one or more communications links (e.g., a communication link 125, a backhaul communication link 120, a midhaul communication link 162, a fronthaul communication link 168).

The at least one memory 725 may include random access memory (RAM), read-only memory (ROM), or any combination thereof. The at least one memory 725 may store computer-readable, computer-executable code 730 including instructions that, when executed by one or more of the at least one processor 735, cause the device 705 to perform various functions described herein. The code 730 may be stored in a non-transitory computer-readable medium such as system memory or another type of memory. In some cases, the code 730 may not be directly executable by a processor of the at least one processor 735 but may cause a computer (e.g., when compiled and executed) to perform functions described herein. In some cases, the at least one memory 725 may contain, among other things, a basic input/output (I/O) system (BIOS) which may control basic hardware or software operation such as the interaction with peripheral components or devices. In some examples, the at least one processor 735 may include multiple processors and the at least one memory 725 may include multiple memories. One or more of the multiple processors may be coupled with one or more of the multiple memories which may, individually or collectively, be configured to perform various functions herein (for example, as part of a processing system).

The at least one processor 735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 735 may be configured to operate a memory array using a memory controller. In some other cases, a memory controller may be integrated into one or more of the at least one processor 735. The at least one processor 735 may be configured to execute computer-readable instructions stored in a memory (e.g., one or more of the at least one memory 725) to cause the device 705 to perform various functions (e.g., functions or tasks supporting tone reservation signaling using distributed coding). For example, the device 705 or a component of the device 705 may include at least one processor 735 and at least one memory 725 coupled with one or more of the at least one processor 735, the at least one processor 735 and the at least one memory 725 configured to perform various functions described herein. The at least one processor 735 may be an example of a cloud-computing platform (e.g., one or more physical nodes and supporting software such as operating systems, virtual machines, or container instances) that may host the functions (e.g., by executing code 730) to perform the functions of the device 705. The at least one processor 735 may be any one or more suitable processors capable of executing scripts or instructions of one or more software programs stored in the device 705 (such as within one or more of the at least one memory 725). In some implementations, the at least one processor 735 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the at least one processor 735, or the transceiver 710, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 705 may transmit information output from the chip or modem. Additionally, or alternatively, in some implementations, the one or more interfaces may refer to an interface between the processing system of the chip or modem and a receiver, such that the device 705 may obtain information or signal inputs, and the information may be passed to the processing system. A person having ordinary skill in the art will readily recognize that a first interface also may obtain information or signal inputs, and a second interface also may output information or signal outputs.

In some examples, a bus 740 may support communications of (e.g., within) a protocol layer of a protocol stack. In some examples, a bus 740 may support communications associated with a logical channel of a protocol stack (e.g., between protocol layers of a protocol stack), which may include communications performed within a component of the device 705, or between different components of the device 705 that may be co-located or located in different locations (e.g., where the device 705 may refer to a system in which one or more of the communications manager 720, the transceiver 710, the at least one memory 725, the code 730, and the at least one processor 735 may be located in one of the different components or divided between different components).

In some examples, the communications manager 720 may manage aspects of communications with a core network 130 (e.g., via one or more wired or wireless backhaul links). For example, the communications manager 720 may manage the transfer of data communications for client devices, such as one or more UEs 115. In some examples, the communications manager 720 may manage communications with other network entities 105, and may include a controller or scheduler for controlling communications with UEs 115 in cooperation with other network entities 105. In some examples, the communications manager 720 may support an X2 interface within an LTE/LTE-A wireless communications network technology to provide communication between network entities 105.

The communications manager 720 may support wireless communications in accordance with examples as disclosed herein. For example, the communications manager 720 is capable of, configured to, or operable to support a means for selecting, based on a channel estimation procedure, a set of tone locations associated with reserving one or more tones for carrying a PAPR reduction signal. The communications manager 720 is capable of, configured to, or operable to support a means for encoding the set of tone locations into a set of multiple bits including systematic information and parity information. The communications manager 720 is capable of, configured to, or operable to support a means for transmitting the parity information to a second device, where the parity information indicates an input to a procedure at the second device for jointly decoding the parity information and a prediction of the set of tone locations at the second device.

By including or configuring the communications manager 720 in accordance with examples as described herein, the device 705 may support techniques for reducing signaling overhead by applying distributed coding to CATR coordination, thereby improving communication speeds and user experience.

In some examples, the communications manager 720 may be configured to perform various operations (e.g., receiving, obtaining, monitoring, outputting, transmitting) using or otherwise in cooperation with the transceiver 710, the one or more antennas 715 (e.g., where applicable), or any combination thereof. Although the communications manager 720 is illustrated as a separate component, in some examples, one or more functions described with reference to the communications manager 720 may be supported by or performed by the transceiver 710, one or more of the at least one processor 735, one or more of the at least one memory 725, the code 730, or any combination thereof (for example, by a processing system including at least a portion of the at least one processor 735, the at least one memory 725, the code 730, or any combination thereof). For example, the code 730 may include instructions executable by one or more of the at least one processor 735 to cause the device 705 to perform various aspects of tone reservation signaling using distributed coding as described herein, or the at least one processor 735 and the at least one memory 725 may be otherwise configured to, individually or collectively, perform or support such operations.

Figure 8:
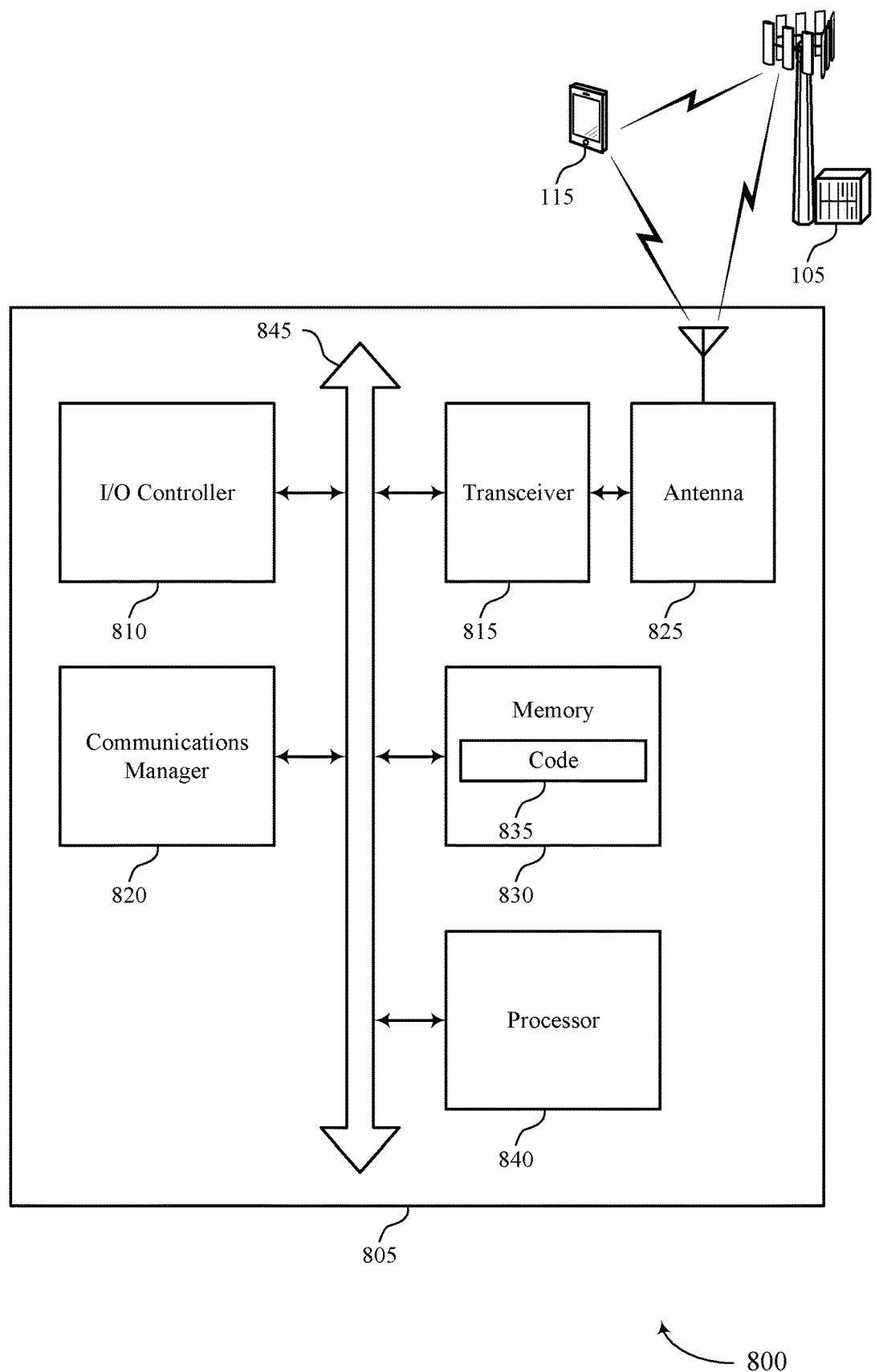
FIG. 8 shows a diagram of a system including a network entity that supports tone reservation signaling using distributed coding in accordance with one or more aspects of the present disclosure.

FIG. 8 shows a diagram of a system 800 including a device 805 that supports tone reservation signaling using distributed coding in accordance with one or more aspects of the present disclosure. The device 805 may be an example of or include the components of a device 405, a device 505, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an I/O controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 415, a transmitter 515, a receiver 410, a receiver 510, or any combination thereof or component thereof, as described herein.

The at least one memory 830 may include RAM and ROM. The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a BIOS which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting tone reservation signaling using distributed coding). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications in accordance with examples as disclosed herein. For example, the communications manager 820 is capable of, configured to, or operable to support a means for selecting, based on a channel estimation procedure, a set of tone locations associated with reserving one or more tones for carrying a PAPR reduction signal. The communications manager 820 is capable of, configured to, or operable to support a means for encoding the set of tone locations into a set of multiple bits including systematic information and parity information. The communications manager 820 is capable of, configured to, or operable to support a means for transmitting the parity information to a second device, where the parity information indicates an input to a procedure at the second device for jointly decoding the parity information and a prediction of the set of tone locations at the second device.

By including or configuring the communications manager 820 in accordance with examples as described herein, the device 805 may support techniques for reducing signaling overhead by applying distributed coding to CATR coordination, thereby improving communication speeds.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of tone reservation signaling using distributed coding as described herein, or the at least one processor 840 and the at least one memory 830 may be otherwise configured to, individually or collectively, perform or support such operations.

Figure 9:
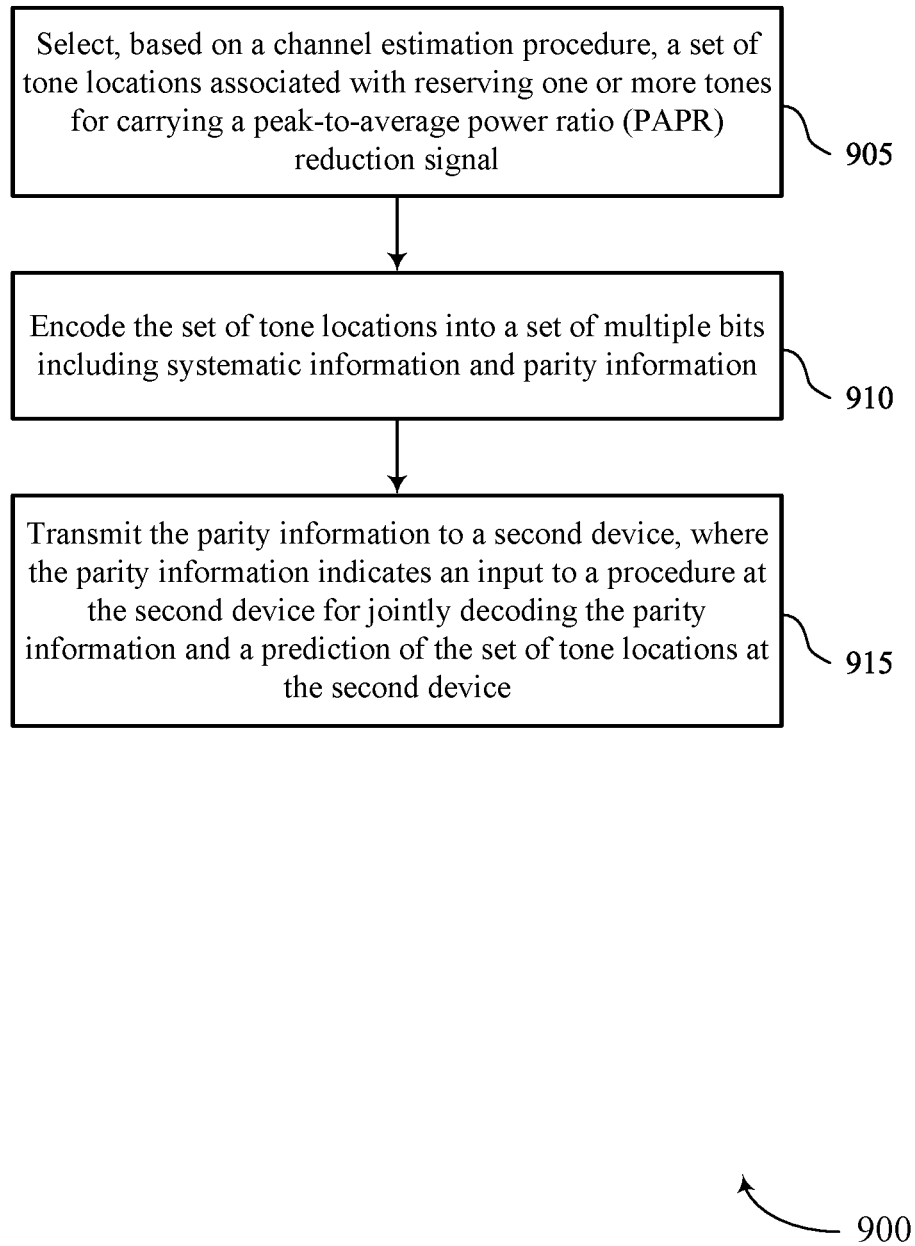
FIG. 9 shows a flowchart illustrating methods that support tone reservation signaling using distributed coding in accordance with one or more aspects of the present disclosure.

FIG. 9 shows a flowchart illustrating a method 900 that supports tone reservation signaling using distributed coding in accordance with aspects of the present disclosure. The operations of the method 900 may be implemented by a network entity or a UE or its components as described herein. For example, the operations of the method 900 may be performed by a network entity or a UE 115 as described with reference to FIGS. 1 through 8. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 905, the method may include selecting, based on a channel estimation procedure, a set of tone locations associated with reserving one or more tones for carrying a PAPR reduction signal. The operations of block 905 may be performed in accordance with examples as disclosed herein. In some examples, aspects of the operations of 905 may be performed by a tone selection component 625 as described with reference to FIG. 6.

At 910, the method may include encoding the set of tone locations into a set of multiple bits including systematic information and parity information. The operations of block 910 may be performed in accordance with examples as disclosed herein. In some examples, aspects of the operations of 910 may be performed by an information encoding component 630 as described with reference to FIG. 6.

At 915, the method may include transmitting the parity information to a second device, where the parity information indicates an input to a procedure at the second device for jointly decoding the parity information and a prediction of the set of tone locations at the second device. The operations of block 915 may be performed in accordance with examples as disclosed herein. In some examples, aspects of the operations of 915 may be performed by an information transmission component 635 as described with reference to FIG. 6.

The following provides an overview of aspects of the present disclosure:

Aspect 1: A method for wireless communications by a first device, comprising: selecting, based at least in part on a channel estimation procedure, a set of tone locations associated with reserving one or more tones for carrying a PAPR reduction signal; encoding the set of tone locations into a plurality of bits comprising systematic information and parity information; and transmitting the parity information to a second device, wherein the parity information indicates an input to a procedure at the second device for jointly decoding the parity information and a prediction of the set of tone locations at the second device.

Aspect 2: The method of aspect 1, wherein encoding the set of tone locations comprises: applying systematic channel coding to the set of tone locations, wherein transmitting the parity information is based at least in part on applying the systematic channel coding.

Aspect 3: The method of aspect 2, further comprising: puncturing the systematic information from the plurality of bits based at least in part on applying the systematic channel coding to the set of tone locations.

Aspect 4: The method of any of aspects 1 through 3, further comprising: applying gray coding to the set of tone locations, wherein transmitting the parity information is based at least in part on applying the gray coding.

Aspect 5: The method of any of aspects 1 through 4, wherein the systematic information comprises a list of the one or more tones.

Aspect 6: The method of any of aspects 1 through 5, wherein the systematic information comprises a list of one or more null positions and a set of frequency bandwidths associated with the one or more null positions.

Aspect 7: The method of any of aspects 1 through 6, wherein the systematic information comprises a vector of binary values indicating indices of the one or more tones, a first binary value indicates a reserved tone position and a second binary value indicates a non-reserved tone position.

Aspect 8: The method of any of aspects 1 through 7, wherein the parity information comprises channel aware tone reservation control information.

Aspect 9: The method of any of aspects 1 through 8, wherein the parity information comprises a set of parity bits.

Aspect 10: The method of any of aspects 1 through 9, wherein the prediction of the set of tone locations at the second device is based at least in part on an assumption of channel reciprocity between the first device and the second device.

Aspect 11: The method of any of aspects 1 through 10, wherein transmitting the parity information comprises: transmitting the parity information via a DCI message, a UCI message, a MAC-CE, an RRC message, or any combination thereof.

Aspect 12: A first device for wireless communications, comprising one or more memories storing processor-executable code, and one or more processors coupled with the one or more memories and individually or collectively operable to execute the code to cause the first device to perform a method of any of aspects 1 through 11.

Aspect 13: A first device for wireless communications, comprising at least one means for performing a method of any of aspects 1 through 11.

Aspect 14: A non-transitory computer-readable medium storing code for wireless communications, the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first device, comprising:
    one or more memories storing processor-executable code; and
    one or more processors coupled with the one or more memories and individually or collectively operable to execute the code to cause the first device to:
        select, based at least in part on a channel estimation procedure, a set of tone locations associated with reserving one or more tones for carrying a peak-to-average power ratio (PAPR) reduction signal;
        encode the set of tone locations into a plurality of bits comprising systematic information and parity information; and
        transmit the parity information to a second device, wherein the parity information indicates an input to a procedure at the second device for jointly decoding the parity information and a prediction of the set of tone locations at the second device.

2. The first device of claim 1, wherein, to encode the set of tone locations, the one or more processors are individually or collectively operable to execute the code to cause the first device to:
    apply systematic channel coding to the set of tone locations, wherein transmitting the parity information is based at least in part on applying the systematic channel coding.

3. The first device of claim 2, wherein the one or more processors are individually or collectively further operable to execute the code to cause the first device to:
    puncture the systematic information from the plurality of bits based at least in part on applying the systematic channel coding to the set of tone locations.

4. The first device of claim 1, wherein the one or more processors are individually or collectively further operable to execute the code to cause the first device to:
    apply gray coding to the set of tone locations, wherein transmitting the parity information is based at least in part on applying the gray coding.

5. The first device of claim 1, wherein the systematic information comprises a list of the one or more tones.

6. The first device of claim 1, wherein the systematic information comprises a list of one or more null positions and a set of frequency bandwidths associated with the one or more null positions.

7. The first device of claim 1, wherein the systematic information comprises a vector of binary values indicating indices of the one or more tones, wherein a first binary value indicates a reserved tone location and a second binary value indicates a non-reserved tone location.

8. The first device of claim 1, wherein:
the parity information comprises channel aware tone reservation control information.

9. The first device of claim 1, wherein the parity information comprises a set of parity bits.

10. The first device of claim 1, wherein the prediction of the set of tone locations at the second device is based at least in part on an assumption of channel reciprocity between the first device and the second device.

11. The first device of claim 1, wherein, to transmit the parity information, the one or more processors are individually or collectively operable to execute the code to cause the first device to:
transmit the parity information via a downlink control information message, an uplink control information message, a media access control control element, a radio resource control message, or any combination thereof.

12. A method for wireless communications by a first device, comprising:
selecting, based at least in part on a channel estimation procedure, a set of tone locations associated with reserving one or more tones for carrying a peak-to-average power ratio (PAPR) reduction signal;
encoding the set of tone locations into a plurality of bits comprising systematic information and parity information; and
transmitting the parity information to a second device, wherein the parity information indicates an input to a procedure at the second device for jointly decoding the parity information and a prediction of the set of tone locations at the second device.

13. The method of claim 12, wherein encoding the set of tone locations comprises:
applying systematic channel coding to the set of tone locations, wherein transmitting the parity information is based at least in part on applying the systematic channel coding.

14. The method of claim 13, further comprising:
puncturing the systematic information from the plurality of bits based at least in part on applying the systematic channel coding to the set of tone locations.

15. The method of claim 12, further comprising:
applying gray coding to the set of tone locations, wherein transmitting the parity information is based at least in part on applying the gray coding.

16. The method of claim 12, wherein the systematic information comprises a list of the one or more tones.

17. The method of claim 12, wherein the systematic information comprises a list of one or more null positions and a set of frequency bandwidths associated with the one or more null positions.

18. The method of claim 12, wherein the systematic information comprises a vector of binary values indicating indices of the one or more tones, wherein a first binary value indicates a reserved tone location and a second binary value indicates a non-reserved tone location.

19. The method of claim 12, wherein the parity information comprises channel aware tone reservation control information.

20. A non-transitory computer-readable medium storing code for wireless communications by a first device, the code comprising instructions executable by one or more processors to:
select, based at least in part on a channel estimation procedure, a set of tone locations associated with reserving one or more tones for carrying a peak-to-average power ratio (PAPR) reduction signal;
encode the set of tone locations into a plurality of bits comprising systematic information and parity information; and
transmit the parity information to a second device, wherein the parity information indicates an input to a procedure at the second device for jointly decoding the parity information and a prediction of the set of tone locations at the second device.

* * * * *